Patented Jan. 15, 1952

2,582,594

UNITED STATES PATENT OFFICE 2,582,594

MATERIALS PRODUCED FROM A POLY-
ETHYLENE MELAMINE

Edward L. Kropa, Old Greenwich, and Henry P.
Wohnsiedler, Darien, Conn., assignors to American Cyanamid Company, New York, N. Y., a
corporation of Maine No Drawing. Application November 25, 1950,
Serial No. 197,637

20 Claims. (Cl. 260—2)

This invention relates to the production of new synthetic materials and, more particularly, new resinous (or potentially resinous) compositions which are especially suitable for use in the plastics and coating arts. Still more particularly the invention is concerned with compositions comprising the product of reaction of ingredients comprising (1) a polyethylene melamine (diethylene melamine or triethylene melamine) and (2) a different nitrogenous compound containing a radical represented by the formula

I

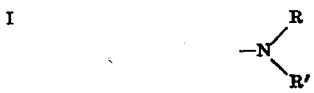

where R represents a member of the class consisting of hydrogen and hydroxyhydrocarbon radicals and R' represents a member of the class consisting of hydrogen, hydrocarbon radicals and hydroxyhydrocarbon radicals, any other elements of the nitrogenous compound of (2), in addition to those present in the radical represented by Formula I, consisting solely of elements of the class consisting of carbon, hydrogen and oxygen. The scope of the invention also includes method features. Instead of diethylene melamine or triethylene melamine alone, a mixture of these polyethylene melamines in any proportions can be used as the reactant with the nitrogenous compound of (2).

Triethylene melamine is a known compound and can be prepared, for example, by the method described in Wystrach and Kaiser Patent No. 2,520,619. It can be represented by the following formula:

II

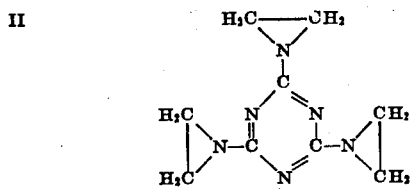

Diethylene melamine can be represented by the following formula:

III

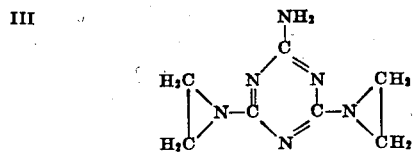

It can be prepared, for instance, as described in the copending application of Donald W. Kaiser and Frederic Schaefer, Serial No. 165,861, filed June 2, 1950. The polyethylene melamines employed in practicing the present invention may be described as being s-triazine (1,3,5-triazine) derivatives wherein at least two of the amino nitrogen atoms of a polyamino-s-triazine each has one ethylene group attached thereto instead of the two hydrogen atoms.

The nitrogenous compounds which are reacted with the polyethylene melamine in producing the new synthetic compositions of our invention are different from the polyethylene melamine reactant and, in all cases, contain a radical represented by the formula

where R and R' have the same meanings as given above with reference to Formula I. Illustrative examples of hydrocarbon radicals which R' can represent are aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, tolylethyl, phenylpropyl, etc.). Illustrative examples of hydroxyhydrocarbon radicals which both R and R' in the radical represented by Formula I can represent are; hydroxyaliphatic (e. g., hydroxymethyl, hydroxyethyl, hydroxypropyl, hydroxyisopropyl, hydroxybutyl, hydroxyisobutyl, hydroxy-sec.-butyl, hydroxybutenyl, hydroxyamyl, hydroxyisoamyl, hydroxyhexyl, hydroxyoctyl, hydroxydecyl, hydroxydodecyl, hydroxyoctadecyl, hydroxyallyl, hydroxymethallyl, hydroxycrotyl, hydroxyoleyl, hydroxyxylinalyl, etc.), including hydroxycycloaliphatic (e. g., hydroxycyclopentyl, hydroxycyclopentenyl, hydroxycycloheptenyl, hydroxycyclooctyl, hydroxycyclohexyl, hydroxycyclohexenyl, hydroxycycloheptyl, etc.); hydroxyaryl (e. g., hydroxyphenyl, hydroxybiphenylyl or hydroxyxenyl, hydroxynaphthyl, etc.); and hydroxy aliphatic-substitued aryl (e. g., hydroxytolyl, hydroxy-xylyl, hydroxy ethylphenyl, hydroxy 2-butenylphenyl, hydroxy tert.-butylphenyl, hydroxy vinylphenyl, hydroxy allylphenyl, etc.).

It is an object of the present invention to prepare a new class of synthetic materials, more particularly resinous compositions, which have particular utility in the plastics and coating arts, e. g., as coating, laminating, adhesive, impregnating, casting and molding compositions as well as in other applications, for instance, in the treatment of textiles, paper, etc. They also may be used as components of plastics and coating compositions. Other objects of the invention will be apparent to those skilled in the art as the description of the invention proceeds.

The present invention is based on our discovery that new and valuable materials for use in coating, molding and other applications can be prepared by effecting reaction between ingredients comprising (1) diethylene melamine and/or triethylene melamine and (2) a different nitrogenous compound containing a radical or radicals (one, two, three, four, five, six or any higher number) represented by Formula I. In their monomeric form or when polymerized only to a relatively low degree or extent, the new reaction products of this invention generally are soluble, but become insoluble upon further advancement of polymerization, that is, become substantially completely cured. Many of the synthetic compositions of this invention, as initially prepared, are thermosetting in nature and can be cured under heat in the form of films or moldings without the aid of a curing catalyst. The principal reaction which seems to take place between the polyethylene melamine and the other nitrogenous compound which is reacted therewith, for example an amidogen compound containing at least one —NH₂ grouping (i. e., one, two, three, four, five, six, seven, eight or any higher number of —NH₂ groupings), appears to be one of addition both in the formation of the monomeric product, as well as in the formation of the polymer. Contrary to expectations, an addition reaction is not the only one which seems to take place since volatile products are formed under certain conditions, indicating that other mechanisms also may explain the reaction. It also appears that the polyethylene melamines undergo self-polymerization similar to that in a vinyl-type polymerization, and this latter type of reaction may compete with the afore-mentioned addition reaction.

The proportions of the reactants can be widely varied depending, for example, upon the particular properties desired in the final product, the rapidity with which it is desired that the reaction should proceed, and other influencing factors. Thus, the reactants can be used in approximately stoichiometrical proportions or with the one somewhat (e. g., from 0.05% to 10 or 20%) in stoichiometrical excess over the other. Or, the reactants can be used in approximately equimolecular proportions or in molar proportions ranging from 1:10 to 10:1, more particularly from 1:2 or 3 to 2 or 3:1.

The temperature of the reaction also can be widely varied depending, for instance, upon the particular reactants employed, the rapidity of reaction wanted, the particular properties desired in the reaction product, and other factors. For example, the reaction temperature can be varied from room temperature (20°-30°C.) up to and including the fusion or boiling temperature of the reaction mixture if the reaction is carried out in the absence of an active or inert liquid medium, or up to and including the boiling point of the reaction mass if the reaction is effected while the primary reactants are dissolved or suspended in such a liquid medium. The temperature is preferably controlled or regulated so that the maximum temperature of reaction is below the temperature of decomposition of the reaction product.

The reaction can be effected in the absence of a solvent or other additive, or in the presence of (i. e., intimately associated with) an inert solvent (e. g., benzene, toluene, xylene, dioxane, acetone, ethyl methyl ketone, methyl isobutyl ketone, chlorobenzene, chloroform, ethylene dichloride, etc.), or in the presence of an active liquid medium, that is, one which is capable of entering into the reaction, more particularly with the polyethylene melamine reactant, for instance, alcohols represented by the formula R—OH, where R represents a monovalent hydrocarbon radical, numerous examples of which have been given hereinbefore with reference to Formula I. Examples of active liquid media that can be used include methanol, ethanol, propanol, butanol, pentanol, hexanol, allyl alcohol, methallyl alcohol, benzyl alcohol and other monohydric alcohols, including those belonging to the saturated and unsaturated aliphatic and aromatic-substituted aliphatic series; the various liquid alcohol-ethers, for example, ethylene glycol monomethyl ether, ethylene glycol monoethyl ether, diethylene glycol monomethyl ether, diethylene glycol monoethyl ether, etc.; as well as numerous others that will be apparent to those skilled in the art. The inert or active liquid medium or additive, if employed, can be used in any suitable amount ranging, for instance, from 0.1 to 40 or 50 times that of the weight of the primary reactants. Good results have been obtained when the inert or active liquid medium was employed in an amount such that the primary reactants constituted from about 20% to about 30 or 35% by weight of the reaction mass. At the end of the reaction period, the inert or unreacted liquid medium is then removed from the reaction mass by any suitable means, for example by distillation, decantation, etc., or the solid reaction product can be separated from the liquid component of the reaction mass by filtration, centrifuging, etc.

In order that those skilled in the art better may understand how the present invention can be carried into effect, the following examples are given by way of illustration and not by way of limitation. All parts and percentages are by weight.

EXAMPLE 1

*Reaction of triethylene melamine and octadecyl amine*

|  | Parts | Approx. Molar Ratio |
|---|---|---|
| Triethylene melamine | 102 | 1 |
| Octadecyl amine (mono-octadecyl amine) | 135 | 1 |
| Chloroform | 710 |  |

A mixture of the above ingredients was heated under reflux at the boiling temperature of the mass for 15 minutes, yielding a solution which contained a small amount of insoluble solids. A white, waxy, powdery reaction product was obtained upon evaporation of the chloroform from a small sample of the solution.

The solution was filtered to remove the solid particles, and the filtrate was heated on a steam bath for about 2 or 3 hours to evaporate most of the solvent. The resulting viscous, liquid resin was poured into a stainless steel tray and then further heated in a 50° C. oven for about 72 hours, yielding a clear, tough, flexible, light-colored resin which was insoluble in boiling ethanol and chloroform. Samples of the finely ground resin were molded into the form of disks for about 10 minutes at about 155° C. under a pressure of about 4000 pounds per square inch. When a molded disk was immersed in boiling water for 30 minutes, it did not crack and there was no dulling of the surface.

The high degree of water repellency of the resinous product of this example is shown by the fact that when some of the finely ground resin was dropped into water it floated on the surface of the water. Hence the resin would be especially suitable for use in the treatment of various textiles (e. g., fabrics of cotton, silk, wool, rayons, etc.) to render them water-repellent. Its properties also indicate that it would be useful as a mold-lubricating and/or plasticizing additive to melamine-formaldehyde, urea-formaldehyde and other resins and molding compositions.

EXAMPLE 2

*Reaction of triethylene melamine and octadecyl amine*

|  | Parts | Approx. Molar Ratio |
|---|---|---|
| Triethylene melamine | 61 | 3 |
| Octadecyl amine | 54 | 2 | were ground together to yield a homogeneous mixture which was heated in a reaction vessel fitted with an air condenser and placed in an oil bath. After heating for 5 minutes at an oil-bath temperature of 130° C., the reaction mass began to sinter in one small area, spreading rapidly throughout the charge which became partly molten and partly sintered. Some fumes rose in the air condenser. The oil bath was removed at the first sign of vigorous reaction. The cooled reaction product was a wax-like solid, partly cream-colored and partly brick-colored, and was substantially insoluble in chlorobenzene.

The finely ground reaction product was extracted successively with about 560, 390 and 390 parts of hexane, bringing the mass to a boil each time and decanting off the supernatant solution. Evaporation of the hexane yielded 35 parts of a waxy product having a melting point of 55°–57° C. The residue from the extraction, after being dried at 110° C., amounted to 57 parts. It was non-resinous in nature and did not melt below or at 196° C.

EXAMPLE 3

*Reaction of triethylene melamine and octadecyl amine*

|  | Parts | Approx. Molar Ratio |
|---|---|---|
| Triethylene melamine | 102 | 1 |
| Octadecyl amine | 135 | 1 |
| Ethanol | 710 |  | were mixed together, and the resulting mixture was heated under reflux at the boiling temperature of the mass for 22 minutes. The solution of the reaction product was filtered to remove a small amount of solids that was present. A sample of the filtrate yielded a wax-like film upon drying in a Petri dish at 50° C. Upon further heating for 2 hours in a 105° C. oven, a clear, tenacious, continuous, water-repellent, cured film was obtained.

EXAMPLE 4

*Reaction of triethylene melamine and n-butyl amine*

|  | Parts | Approx Molar Ratio |
|---|---|---|
| Triethylene melamine | 150.0 | 1 |
| n-Butyl amine | 53.6 | 1 |
| Ethanol | 600.0 |  | were heated together at refluxing temperature for 40 minutes. The solution of the resulting reaction product was pressure-filtered. A clear, thin, water-white solution was obtained. This solution was stable for more than 5 but less than 20 weeks. Films produced by baking samples of the solution for 1½ hours at 105° C. and for the same time at 120° C. showed good hardness, those baked at the higher temperatures having better water resistance than those which had been heated at 105° C.

EXAMPLE 5

*Reaction of triethylene melamine and diethylene triamine*

|  | Parts | Approx. Molar Ratio |
|---|---|---|
| Triethylene melamine | 102 | 1 |
| Diethylene triamine | 52 | 1 |
| Water | 290 |  |

A mixture of the above ingredients was brought to reflux temperature in 5 minutes, at the end of which period the mass began to reflux vigorously before all the triethylene melamine had completely dissolved. The reaction vessel was removed from the source of heat, but refluxing continued for about 1 minute. The reaction mass first formed a soft, translucent gel which later became opaque. The moist gel had only a slight amine odor. The gel was removed from the vessel and tray-dried at 50° C. After drying for 1½ hours at this temperature, the gel particles were partly clear; after about 16 hours' additional drying, the product was hard and completely clear.

EXAMPLE 6

*Reaction of triethylene melamine and diethylene triamine*

Fifty (50) parts of triethylene melamine and 78 parts of diethylene triamine were thoroughly mixed together in a reaction vessel, which was then heated on a hot plate. No change was noted upon heating up to 62° C., but at this temperature vapor was first evolved. The temperature rose to 110° C., at which point the evolution of vapor was pronounced and the mass was predominantly clear. The reaction mass was allowed to cool, and was then re-heated to about 85° C. The product, upon cooling to room temperature, was a water-white, somewhat friable, elastic gel. This gel was ground with an additional 50 parts of triethylene melamine to form a fine, granular product. Portions of this material were molded into disks, 2 inches in diameter, at 100° C., 125° C. and 155° C. In all cases the molded disks were light-colored, being flexible when warm and harder when cold. Improvement in strength was obtained by molding at the higher temperatures.

EXAMPLE 7

Reaction of triethylene melamine and diethylene triamine

|  | Parts | Approx. Molar Ratio |
|---|---|---|
| Triethylene melamine | 75 | 1 |
| Diethylene triamine | 78 | 2 | were warmed together to 42° C. at which temperature the beginning of an exothermic reaction was noted, which reaction became more accelerated upon further heating to 60° C. The temperature rose to 118° C. in 1½ minutes accompanied by profuse fumes and ebullition. As the reaction proceeded at this temperature the product changed from a clear fluid to a more viscous fluid, then to a soft gel, and finally to a friable gel.

EXAMPLE 8

Reaction of triethylene melamine and diethylene triamine

Equal molar proportions of triethylene melamine and diethylene triamine were cautiously heated first to 60°–70° C. (using an ice bath throughout when necessary to check the exothermic reaction), then after 5–10 minutes to 70°–80° C., and finally to about 85° C. At the latter temperature, thickening followed by gelation made further stirring impractical. The cooled product had a texture between that of a firm gel and a soft, horn-like mass. Samples taken from the reaction mass at 65° C. and 75° C. were balsam-like products and soft resins, respectively, when cool, but these converted into gels upon standing for about 16 hours.

Some of the end reaction product was molded into disks by molding for 10 minutes at about 155° C. under a pressure of about 4000 pounds per square inch. The molded pieces were highly flexible when removed from the hot mold, were tough when cold, and were light in color.

EXAMPLE 9

Reaction of triethylene melamine and diethylene triamine

|  | Parts | Approx. Molar Ratio |
|---|---|---|
| Triethylene melamine | 102 | 1.0 |
| Diethylene triamine | 77 | 1.5 |

A mixture of the above ingredients was warmed gradually to 68° C., after which the temperature rose rapidly (due to the exothermic reaction) from 75° C. to 100° C. accompanied by moderate ebullition. The cooled reaction product was clear and horn-like.

EXAMPLE 10

Reaction of triethylene melamine and piperazine

|  | Parts | Approx. Molar Ratio |
|---|---|---|
| Triethylene melamine | 102.0 | 1.0 |
| Piperazine | 71.5 | 1.5 |

A dry mixture of the above ingredients was warmed gradually, with stirring, in a reaction vessel placed on a hot plate. At 60° C. the mixture began to soften, becoming very fluid at 70° C. At this point the temperature rose almost instantaneously due to an exothermic reaction. The rise in temperature was accompanied by ebullition, clouds of vapor and setting of the hot mixture to a brownish, hard, honeycomb resin.

EXAMPLE 11

Reaction of triethylene melamine and diethylene triamine

|  | Parts | Approx. Molar Ratio |
|---|---|---|
| Triethylene melamine | 102 | 1.0 |
| Diethylene triamine | 77 | 1.5 |
| Ethanol | 330 | | were heated together in a reaction vessel fitted with a reflux condenser and placed in an oil bath. The mixture was brought to vigorous refluxing in 5 minutes, at which point the vessel was partly removed from the oil bath so that only moderate refluxing would occur. After thus refluxing for 5 minutes most of the material was in solution, although a few soft lumps of insoluble, gelatinous matter was present. After checking further reaction by cooling the reaction mass, the product was transferred to a stainless steel tray which was then placed in a 50° C oven. Upon evaporation of the ethanol, additional soft agglomerates were formed, as well as a clear film which changed on heating for 2 hours at 50° C. to a slightly soft, tough resin which was partly gel-like in structure and only slightly attacked by water. Only a slight odor of amine was noted during drying. Translucent disks were obtained upon molding samples of the ground, dried resin at about 155° C. under a pressure of about 4000 pounds per square inch.

EXAMPLE 12

Reaction of triethylene melamine and diethylene triamine

|  | Parts | Approx. Molar Ratio |
|---|---|---|
| Triethylene melamine | 102 | 1.0 |
| Diethylene triamine | 81 | 1.5 |
| Ethylene dichloride | 330 | |

A mixture of the above ingredients was brought to reflux by heating for 3 minutes in a reaction vessel fitted with a reflux condenser, and was then refluxed for 11 minutes. Soft, gelatinous masses precipitated from the solvent at the end of the reaction period. The reaction mass was transferred to a Petri dish which was placed in a 50° C. oven. The mass dried in 1¾ hours to tough, translucent, resinous agglomerates in cemented form, a clear film being formed on the dish where the solvent had evaporated. The resin was only slightly attacked by water. Samples of the dried, ground resin were molded as described in the preceding example, yielding cured, molded pieces having, in general, considerable flexibility.

EXAMPLE 13

*Reaction of triethylene melamine and diethylene triamine*

|  | Parts | Approx. Molar Ratio |
|---|---|---|
| Triethylene melamine | 150 | 2 |
| Diethylene triamine | 38 | 1 |
| Ethanol | 570 | | were heated together under reflux at the boiling temperature of the mass for 50 minutes, yielding a solution which was practically clear. A straw-colored, completely clear solution was obtained by pressure filtration of this liquid reaction product. The filtered solution, which can be used as a coating composition or as a component of coating compositions, was noticeably more viscous than the product of Example 4.

EXAMPLE 14

*Reaction of triethylene melamine and diethylene triamine*

|  | Parts | Approx. Molar Ratio |
|---|---|---|
| Triethylene melamine | 300 | 2 |
| Diethylene triamine | 76 | 1 |
| Ethanol | 376 | |

The above ingredients were heated, with stirring, under reflux for 3 minutes at the boiling temperature of the mass, yielding a solution which was clear on cooling. After standing for 24 minutes, during which time the reaction mass remained at about 75°–80° C., the solution thickened. Vacuum was applied for about 4 minutes thereby to remove about 70 to 75 parts of distillate. The residue formed a gel which was friable when cold. The gel was broken into small pieces, which were oven-dried for 3 hours at 55° C. The dried material was hard and resinous.

EXAMPLE 15

*Reaction of triethylene melamine and ethanolamine*

|  | Parts | Approx. Molar Ratio |
|---|---|---|
| Triethylene melamine | 90 | 1 |
| Ethanolamine (monoethanolamine) | 27 | 1 |
| Ethanol | 217 | | were heated together, with stirring, in a reaction vessel fitted with a reflux condenser and placed in an oil bath. The temperature of the mass was brought to 66° C. in 5 minutes. After heating to 74° C. in an additional minute, the solids had completely dissolved. Refluxing began a minute later at 81° C., and was caused to continue for a total of 8 minutes. The solution comprising the reaction product was cooled to 28° C., a small amount of insoluble matter being present in the cooled solution. A sample of the solution was dried to yield a clear, balsam-like material, which became a fairly hard resin after drying for about 16 hours. Filtration of the bulk of the liquid product gave a clear, water-white solution which tolerated 5 parts of water per 1 part of the solution without clouding. The liquid product of this example is suitable for use as a coating composition or as a component of such compositions.

EXAMPLE 16

*Reaction of triethylene melamine and ethanolamine*

|  | Parts | Approx. Molar Ratio |
|---|---|---|
| Triethylene melamine | 150 | 1 |
| Ethanolamine | 45 | 1 |
| Ethanol | 585 | | were mixed and heated, being brought to reflux temperature (80° C.) in 10 minutes. After heating at the reflux temperature for 5 minutes, a sample was clear on cooling and yielded a semicrystalline residue. Refluxing was continued for an additional 5 minutes, giving a solution which also was clear on cooling. A clear resin resulted upon evaporation of the solvent from a sample of the solution. The main portion of the solution was mixed with finely divided diatomaceous earth and then filtered under pressure, yielding a thin, water-white solution. When metal panels were coated with this solution and baked for 1½ hours at 120° C., the resin therein converted under heat to hard, clear films which were unaffected by water after more than 4 hours' immersion.

EXAMPLE 17

*Reaction of diethylene melamine and n-butyl amine*

|  | Parts | Approx. Molar Ratio |
|---|---|---|
| Diethylene melamine | 50.0 | 1 |
| n-Butyl amine | 20.5 | 1 | were thoroughly mixed in an open reaction vessel, which was immersed in an oil bath maintained at 180° C. After immersion for about 1 minute in this bath, the mixture fumed violently and formed a hard mass of reaction product.

EXAMPLE 18

*Reaction of diethylene melamine and ethylene diamine*

|  | Parts | Approx. Molar Ratio |
|---|---|---|
| Diethylene melamine | 50.0 | 2 |
| Ethylene diamine (92%) | 9.1 | 1 |
| Ethylene glycol monoethyl ether | 100.0 | |

The same procedure was followed as described under Example 17. A fairly clear solution was formed at the boiling point within 6 minutes, at the end of which time the solution was converted into a coral-colored gel. Upon further heating, the wet gel dried out and formed an infusible mass.

EXAMPLE 19

*Reaction of diethylene melamine and 1,3-diaminobutane*

|  | Parts | Approx. Molar Ratio |
|---|---|---|
| Diethylene melamine | 50.0 | 1 |
| 1,3-Diaminobutane | 24.7 | 1 |
| Dioxane | 103.5 | | were heated together as described under Example 17. A thermoplastic resinous mass was formed after 8 minutes' heating at the boiling point. This resin melted at 80° C. and heat-set at 150° C. in 19 hours to a hard resin.

EXAMPLE 20

*Reaction of diethylene melamine and decamethylene diamine*

|  | Parts | Approx. Molar Ratio |
|---|---|---|
| Diethylene melamine | 50 | 1 |
| Decamethylene diamine | 48 | 1 | were mixed and heated together as described under Example 17, yielding a hard, polymerized mass after immersion for 1 minute in the 180° C. oil bath.

EXAMPLE 21

*Reaction of diethylene melamine and diallyl amine*

|  | Parts | Approx. Molar Ratio |
|---|---|---|
| Diethylene melamine | 50.0 | 1 |
| Diallyl amine | 54.5 | 2 |

The same general procedure was followed as described under Example 17. After immersion for 6 minutes in the 180° C. oil bath, violent fumes were given off and a hard, resinous mass was formed.

EXAMPLE 22

*Reaction of diethylene melamine and ethanolamine*

|  | Parts | Approx. Molar Ratio |
|---|---|---|
| Diethylene melamine | 50 | 1 |
| Ethanolamine | 34 | 2 | were mixed and heated by means of a 180° C. oil bath as described under Example 17. After 13 minutes' immersion in this bath, the reaction mass formed an amber-colored, fusible resin which was non-hardening up to 175° C. in film form.

EXAMPLE 23

*Reaction of diethylene melamine and triethanolamine*

|  | Parts | Approx. Molar Ratio |
|---|---|---|
| Diethylene melamine | 50 | 1 |
| Triethanolamine | 42 | 1 |

The procedure and results (both during the reaction and upon subsequent baking of the resin film) were essentially the same as those described under Example 22.

EXAMPLE 24

*Reaction of diethylene melamine and ethylene diamine*

|  | Parts | Approx. Molar Ratio |
|---|---|---|
| Diethylene melamine | 30.0 | 2 |
| Ethylene diamine (92%) | 5.6 | 1 |
| Water | 100.0 | | were thoroughly mixed in an open reaction vessel, which was immersed in an oil bath at 122° C. After 10 minutes' immersion, white, agglomerated solids precipitated. These solids were insoluble in hot ethylene glycol monomethyl ether and, also, in hot, aqueous formaldehyde. A very heat-resistant, infusible, resinous mass was obtained by baking the wet solids first for 3 hours at 65° C. and then for 1½ hours at 105° C.

EXAMPLE 25

*Reaction of diethylene melamine and ethanolamine*

|  | Parts | Approx. Molar Ratio |
|---|---|---|
| Diethylene melamine | 30.0 | 2 |
| Ethanolamine | 5.2 | 1 |
| Ethylene glycol monomethyl ether | 100.0 | |

The same procedure was followed as described under Example 24. After being heated for 15 minutes in the 122° C. bath, the reaction mixture formed a clear solution. Portions of this solution were applied to metal panels which were heated first for 3 hours at 65° C. and then, in one case, for 1½ hours at 105° C. and, in another case, for 1½ hours at 150° C. In both cases, the resulting continuous films were clear, hard and almost colorless, and were not attacked by ethylene glycol monomethyl ether.

EXAMPLE 26

*Reaction of diethylene melamine and diethylene triamine*

|  | Parts | Approx. Molar Ratio |
|---|---|---|
| Diethylene melamine | 30.0 | 4 |
| Diethylene triamine | 4.3 | 1 |
| Ethylene glycol monomethyl ether | 100.0 | |

The procedure in this example also was the same as that described under Example 24. A clear solution resulted after heating the reaction mixture for only 10 minutes in the 122° C. oil bath. Panels coated with portions of this solution, when dried and baked as described under Example 25, gave clear, hard, tough films which were unaffected by ethylene glycol monomethyl ether, and practically unaffected after being immersed in water for 8 hours.

EXAMPLE 27

*Reaction of diethylene melamine and diethylene triamine*

|  | Parts | Approx. Molar Ratio |
|---|---|---|
| Diethylene melamine | 150 | 1 |
| Diethylene triamine | 87 | 1 |
| Ethylene glycol monomethyl ether | 710 | | were heated together under reflux at the boiling temperature of the mass for 95 minutes, at the end of which period the solution of the reaction product was clear when cool. Fairly hard films were obtained by heating panels coated with portions of the solution for 4 hours at 150° C. and for 7 hours at 105° C. Longer periods of heating at these temperatures produce harder films.

EXAMPLE 28

*Reaction of diethylene melamine and diethylene triamine*

|  | Parts | Approx. Molar Ratio |
|---|---|---|
| Diethylene melamine | 150 | 1 |
| Diethylene triamine | 87 | 1 | were heated together in an open reaction vessel to 130° C. over a period of 5 minutes, yielding a pasty, fuming mass. At this point the temperature rose rapidly in ½ minute to 195° C. due to the exothermic reaction, the reaction vessel having been removed from the source of heat when the temperature reached 150° C. The mass polymerized to a semi-rigid gel which was hard when cool.

EXAMPLE 29

*Reaction of triethylene melamine and urea*

|  | Parts | Approx. Molar Ratio |
|---|---|---|
| Triethylene melamine | 150.0 | 1 |
| Urea | 88.5 | 1 |
| Water | 720.0 | | were mixed and heated under reflux at the boiling temperature of the mass for about 8 minutes. After reaching the reflux temperature, the reaction appeared to be exothermic. A white, amorphous mass precipitated from the solution, this mass becoming soft and dry as the amount thereof increased on cooling. Upon drying the reaction product at 50° C., a translucent resin was obtained. Samples of the ground resin were molded at 150°-175° C. for 5 minutes under a pressure of approximately 2 to 4 tons per square inch, yielding semitranslucent disks.

EXAMPLE 30

*Reaction of triethylene melamine and acrylamide*

|  | Parts | Approx. Molar Ratio |
|---|---|---|
| Triethylene melamine | 150 | 1 |
| Acrylamide | 52 | 1 |
| Ethanol | 800 | |

A mixture of the above ingredients was heated in a reaction vessel provided with a reflux condenser, being brought to the beginning of reflux in 3 minutes. After refluxing for 30 minutes, 10 parts of n-butyl amine was added as a catalytic reactant to facilitate the reaction, and heating under reflux was continued for an additional 55 minutes. The resulting solution of the reaction product was clear both hot and cold. Glass and metal panels were coated with portions of the solution. After standing for about 16 hours at room temperature, the coated panels were heated, in one case, in a 105° C. oven for 1½ hours and, in another case, in a 120° C. oven for the same length of time. In both cases the baked films were clear and hard, and could be bent around a mandrel, ½ inch in diameter, without cracking.

EXAMPLE 31

*Reaction of triethylene melamine and urea*

|  | Parts | Approx. Molar Ratio |
|---|---|---|
| Triethylene melamine | 100 | 1 |
| Urea | 200 | 3 | were mixed in a reaction vessel which was then placed in a 140°-155° C. oil bath. At the end of 3 minutes a spontaneous reaction occurred at the higher temperature, resulting in the evolution of fumes and the formation of a dark-colored reaction product.

EXAMPLE 32

*Reaction of triethylene melamine and stearamide*

|  | Parts | Approx. Molar Ratio |
|---|---|---|
| Triethylene melamine | 100 | 1 |
| Stearamide | 140 | 1 |

The same procedure was followed as described under Example 31. At the end of a 4-minute heating period (bath temperature of 140°-155° C.) a spontaneous reaction occurred that was less violent than that of the preceding example. No fumes were evolved, but the reaction yielded a dark-colored, hardened, porous mass of reaction product.

EXAMPLE 33

*Reaction of triethylene melamine and benzamide*

|  | Parts | Approx. Molar Ratio |
|---|---|---|
| Triethylene melamine | 100 | 1 |
| Benzamide | 180 | 1 |

The procedure in this example likewise was essentially the same as that described under Example 31. With the oil bath at 140° C. there occurred a spontaneous reaction 2 minutes after the reaction vessel was immersed in the bath with the evolution of fumes and the formation of a hard reaction product.

EXAMPLE 34

Reaction of triethylene melamine and benzamide

|  | Parts | Approx. Molar Ratio |
|---|---|---|
| Triethylene melamine | 102.0 | 1.0 |
| Benzamide | 63.5 | 1.05 |
| Chlorobenzene | 1,106.0 |  | were heated together, with stirring, under reflux at boiling temperature for 65 minutes. The insoluble reaction product was removed by filtration, washed with chlorobenzene and dried at 80° C. The dried product did not melt when ignited, and was insoluble in boiling ethanol and boiling methyl isobutyl ketone.

EXAMPLE 35

Reaction of triethylene melamine and α-hydroxyisobutyramide

|  | Parts | Approx. Molar Ratio |
|---|---|---|
| Triethylene melamine | 102.0 | 1 |
| α-Hydroxyisobutyramide | 51.5 | 1 |
| Acetone | 614.0 |  |

The above ingredients were mixed and refluxed for 3½ hours, at the end of which period 2.47 parts of diethylene triamine was added as a catalytic reactant to facilitate the reaction. After an additional reflux period of 2¼ hours, about 10 parts more of diethylene triamine was added to the reaction mass, and refluxing was continued for another 3¾ hours. At this point the solution was relatively clear on cooling and deposited films when coated on panels. These films were brilliantly clear and were hard when baked at temperatures of the order of 105°–150° C.

EXAMPLE 36

Essentially the same procedure was followed as in Example 35 with the exception that 462 parts of ethyl alcohol was used instead of 614 parts of acetone, and the catalytic reactant comprising diethylene triamine was omitted.

EXAMPLE 37

Reaction of triethylene melamine and succinamide

|  | Parts | Approx. Molar Ratio |
|---|---|---|
| Triethylene melamine | 102 | 1 |
| Succinamide | 58 | 1 |
| Water | 250 |  | were heated together under reflux at the boiling temperature of the reaction mass for 5 minutes, yielding a white, translucent gel.

EXAMPLE 38

Reaction of triethylene melamine and polyaminocaproamide

The polyaminocaproamide used in this example had an average molecular weight of about 582 and may be represented by the formula $$H[-NH(CH_2)_5-CO-]_{4-5}NH_2.$$

|  | Parts | Approx. Molar Ratio |
|---|---|---|
| Triethylene melamine | 102.0 | 6 |
| Polyaminocaproamide | 48.5 | 1 |
| Water | 450.0 |  | were stirred together in a heated reaction vessel provided with a reflux condenser. The temperature of the mass was brought to 90° C. in 10 minutes, at which point it formed a milky dispersion. Heating was continued for 3 minutes to the reflux temperature (98° C.) and then for 5 minutes at reflux, yielding a thick, creamy product. The reaction product was dried for 2 hours at 50°–60° C., and then for 3 days over calcium chloride in a desiccator under vacuum. The dried product was ground, and samples thereof were molded, in the form of disks, for 5 minutes at 140°–150° C. under a pressure of about 4000 pounds per square inch. The disks were discharged hot from the mold. Translucent disks having good strength were obtained. Better plastic flow was obtained by molding at 140° C. as compared with a molding temperature of 150° C.

It will be understood, of course, by those skilled in the art that our invention is not limited to the specific reactants, proportions thereof and conditions of reaction given by way of illustration in the foregoing examples. For instance, in any of the examples wherein diethylene melamine has been used, we can use an equivalent amount of triethylene melamine; also, in any of the examples wherein triethylene melamine has been employed, we can use an equivalent amount of diethylene melamine; furthermore, in any of the examples wherein a single polyethylene melamine has been used, we can employ in lieu thereof a mixture of diethylene melamine and triethylene melamine in any proportions, as will be apparent to those skilled in the art.

From the foregoing description and illustrative examples it will be seen that the co-reactant with the polyethylene melamine is a nitrogenous compound (including a carbon-containing nitrogenous compound) having at least one radical represented by the formula $$-N\begin{matrix}R\\R'\end{matrix}$$

where R and R' have the same meanings given above with reference to Formula I. Thus, the nitrogenous co-reactant with the polyethylene melamine can be an alkanolamine, a polyalkylenepolyamine, a hydrocarbon-substituted amine containing at least one hydrogen atom attached to the amino nitrogen atom, etc. Such nitrogenous substances may be designated generically, for purpose of brevity, as "amino" compounds. If the amino compound is one which contains a plurality of amino groupings, one of such groupings may be unsubstituted, or partly substituted, or completely substituted by hydroxyhydrocarbon radicals, and the remainder may be unsubstituted, partly substituted or completely substituted. The grouping

can be a component of other groupings, for instance groupings represented by the following formulas:

1.  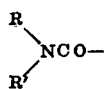

e. g., carbamyl, methylcarbamyl, hydroxy-ethyl-carbamyl, etc.

2.  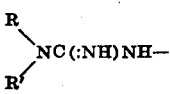

e. g., guanido, methylguanido, etc.

3.  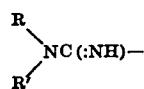

e. g., guanyl, ethylguanyl, hydroxy-methylguanyl, etc.

4.  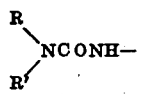

e. g., ureido, methylureido, hydroxy-ethylureido. Etc.

In the above formulas R and R' have the same meanings as given above with reference to Formula I. The amino compounds employed in practicing our invention include, but are not limited to, these embraced by the following general formulas:

A.  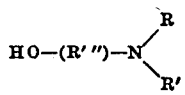

B.  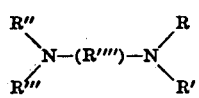

where R and R' have the same meanings as given above with reference to Formula I; R'' and R''' can be any of the substituents represented by R and R' in Formula I or any other monovalent radical including those listed above Groups 1 to 4, inclusive); and R'''' represents a divalent organic radical such, for instance, as a divalent hydrocarbon radical (e. g., alkylene, arylene, arylalkylene, alkarylene, etc.), a divalent hydrocarbon radical containing at least one ether linkage (e. g., one, two, three, four, five, or any number of ether linkages), an s-triazinylene radical (a divalent triazine), a pyrimidylene radical (a divalent pyrimidine), a triazolylene radical (a divalent triazole), etc. If the structure so permits, any number of —NRR' or of —NR'' R''' groups (Formula B) ranging from one up to the combining power of the nucleus may be attached to the divalent radical represented by R''''.

More specific examples of amino compounds, that is, co-reactants with the polyethylene melamine, which can be used in practicing our invention include the following (singly or a plurality thereof):

Butylamine (monobutylamine)
N-ethylbutylamine ($C_2H_5NHC_4H_7$)
Dibutylamine
2-amino-4-methylpentane

[$CH_3CHNH_2CH_2CH(CH_3)_2$]

n-Amylamine
Di-n-amylamine
Hexylamine
Dihexylamine
Heptylamine
Diheptylamine
Octylamine
Dioctylamine
Decylamine
Didecylamine
Octadecylamine
Dioctadecylamine
Ethylenediamine
1,3-diaminopropane ($NH_2CH_2CH_2CH_2NH_2$)
3-diethylaminopropylamine

[$(C_2H_5)_2NCH_2CH_2CH_2NH_2$]

1,3-diaminobutane ($NH_2CH_2CH_2CHNH_2CH_3$)
1,3-bis-ethylaminobutane

[$C_2H_5NHCH_2CH_2CHNH(C_2H_5)CH_3$]

1,4-diaminobutane
1,5-diaminopentane
1,6-diaminohexane
1,7-diaminoheptane
1,8-diaminooctane
Diethylenetriamine ($NH_2CH_2CH_2NHCH_2CH_2NH_2$)

Triethylenetetramine

[$NH_2(CH_2CH_2NH)_2CH_2CH_2NH_2$]

Tetraethylenepentamine
Pentaethylenehexamine
Propylenediamine (1,2-diaminopropane)
Diethanolamine [$(HOCH_2CH_2)_2NH$]
Hydroxyethyl ethylenediamine ($NH_2CH_2CH_2NHCH_2CH_2OH$)

Monoisopropanolamine
Diisopropanolamine
Bis (3-aminopropyl) ether ($NH_2CH_2CH_2CH_2OCH_2CH_2CH_2NH_2$)

Bis(4-aminobutyl) ether
Bis(5-aminoamyl) ether
Bis (6-aminohexyl) ether
o-, m- and p-Phenylenediamines
Benzidine
2-aminobenzidine
Aminoguanidine
Guanidine
Monophenyl biguanide
1,1-dimethylhydrazine
Semicarbazide
Aniline
N-butylaniline
o-, m- and p-Toluidines
o-, m- and p-Tolylenediamines
p,p'-Diaminodiphenyl ether
1,4-diaminoanthraquinone
p,p'-Diaminodiphenylmethane
4-amino-2-butanol ($CH_3CHOHCH_2CH_2NH_2$)
1-methylamino-2-propanol ($CH_3NHCH_2CHOHCH_3$)

5-isopropylamino-1-pentanol

[$HOCH_2CH_2CH_2CH_2CH_2NHCH(CH_3)_2$]

Melamine and the various other amino-1,3,5-triazines which are different from the polyethylene melamine reactant employed and which contain at least one —NRR' radical, where R and R' have the same meanings as in Formula I, numerous examples of which compounds are given, for instance, in Patent No. 2,320,818 and No. 2,361,823.

Aminopyrimidines and the various other aminodiazines containing at least one —NRR' radical, where R and R' have the same meanings as in Formula I, numerous examples of which compounds are given, for instance, in Patent No. 2,379,691.

Guanazole and the various other aminotriazoles containing at least one —NRR' radical, where R and R' have the same meanings as in Formula I, numerous examples of which compounds are given, for instance, in Patent No. 2,320,820.

Other examples (for instance, proteins such as casein, etc.) will be apparent to those skilled in the art from the above formulas and from the foregoing examples.

As indicated hereinbefore and as further shown by a number of the examples, the properties of the fundamental resinous or non-resinous reaction products of this invention can be varied widely by introducing other modifying bodies before, during or after effecting reaction between the primary components. Thus, as modifying agents we may use, for instance, monohydric alcohols, e. g., methyl, ethyl, propyl, isopropyl, butyl, hexyl, N-octyl, 2-ethylhexyl, decyl, dodecyl, cetyl, lauryl, capryl or tetrahydrofurfuryl alcohol, pentanol or mixtures of isomeric pentanols (which mixtures also may include N-pentanol), cyclohexanol, methyl cyclohexanol, etc.; polyhydric alcohols, e. g., glycerol, pentaerythritol, dipentaerythritol, mannitol, sorbitol, ethylene glycol, diethylene glycol and others such as are disclosed, for example, in Schaefer Patent No. 2,481,155; alcohol-ethers, e. g., ethylene glycol ronomethyl ether, ethylene glycol monoethyl ether, ethylene glycol monobutyl ether, diethylene glycol monomethyl ether, diethylene glycol monoethyl ether, diethylene glycol monobutyl ether, etc.; and the like. Mixtures of reactants of each class employed in producing our fundamental reaction product can be used, as desired or as may be required, for instance a mixture of an amine and an amide as the substance which is reacted with one or more polyethylene melamines; or a mixture of unsubstituted urea or other amide and an acylated urea, including halogenated acylated ureas, e. g., acetyl urea, propionyl urea, chloroacetyl ureas, etc.

Illustrative examples of other modifying bodies that can be incorporated into the fundamental reaction products, during their preparation or after they have been formed, are melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc.; polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

Dyes, pigments, driers, curing agents (in some cases where a more accelerated cure is desired), plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the synthetic materials of our invention, as desired or as conditions may require, in order to provide a coating, molding or other composition best adapted to meet a particular service use. For additional and more detailed information concerning the modifying ingredients that may be employed in producing coating compositions from our new resins, reference is made to the aforementioned Moore patent.

The modified and unmodified reaction products, more particularly resinous reaction products, of this invention have a wide variety of uses. For example, in addition to their use in the production of coating and molding compositions, they may be employed as modifiers of other natural and synthetic resins. Thus, some of them advantageously may be used to improve the plasticity or flow characteristics of thermosetting resins which have insufficient or unsatisfactory plasticity during curing to an insoluble, infusible state, e. g., certain urea-formaldehyde or melamine-formaldehyde resins or molding compositions where better flow during molding, without decreasing the cure time, is desirable. The soluble resins of this invention also can be dissolved in appropriate solvents. Some of the solvents that may be employed to dissolve a particular reaction product of our invention include benzene, toluene, xylene, amyl acetate, butanol, methyl ethyl ketone, etc. The dissolved resins can be used as laminating varnishes in the production of laminated articles wherein sheet materials, e. g., paper, cloth, sheet asbestos, etc., are coated or coated and impregnated with the resin solution, superimposed and thereafter united under heat and pressure. They also can be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also can be used for treating textile materials (e. g., cotton, linen, rayon and other cellulose-containing textiles, wool, silk and other natural or synthetic proteinaceous textiles, including nylon and textiles derived from polyacrylonitrile and acrylonitrile copolymers, and from casein, soyabeans, etc.), in filament, thread, yarn, fabric (woven or felted) or other form, in order to improve the properties of such textile materials, e. g., to increase the stiffness, to increase the service life, to impart shrinkage resistance thereto, or otherwise to enhance the properties of the treated materials and to make them more useful or serviceable to the ultimate user. They also may be employed for treating leather in order to improve its appearance and physical properties.

We claim:

1. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) a different nitrogenous compound containing a radical represented by the formula

where R represents a member of the class consisting of hydrogen and hydroxyhydrocarbon radicals and R' represents a member of the class consisting of hydrogen, hydrocarbon radicals and hydroxyhydrocarbon radicals, any other elements of the said nitrogenous compound of (2), in addition to those present in the aforementioned radical represented by the formula

consisting solely of elements of the class consisting of carbon, hydrogen and oxygen, and the ingredients of (1) and (2) being employed in molar proportions ranging from 1:10 to 10:1.

2. A composition as in claim 1 wherein R represents hydrogen.

3. A composition comprising the product of reaction of ingredients comprising (1) triethylene melamine, the formula for which is

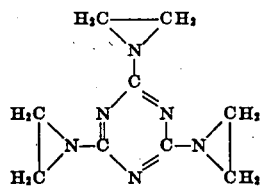

and (2) an amidogen compound containing at least one —NH₂ grouping, any other elements of the amidogen compound of (2), in addition to those present in the said —NH₂ grouping, consisting solely of elements of the class consisting of carbon, hydrogen and oxygen, and the ingredients of (1) and (2) being employed in molar proportions ranging from 1:10 to 10:1.

4. A composition comprising the product of reaction of ingredients comprising (1) diethylene melamine, the formula for which is

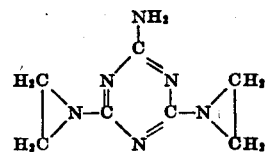

and (2) an amidogen compound containing at least one —NH₂ grouping, any other elements of the amidogen compound of (2), in addition to those present in the said —NH₂ grouping, consisting solely of elements of the class consisting of carbon, hydrogen and oxygen, and the ingredients of (1) and (2) being employed in molar proportions ranging from 1:10 to 10:1.

5. A liquid composition comprising (1) a soluble product of reaction of ingredients comprising (a) triethylene melamine, the formula for which is

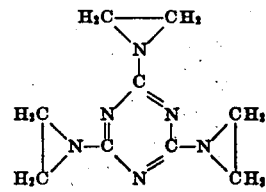

and (b) an amidogen compound containing an —NH₂ grouping, any other elements of the amidogen compound of (b), in addition to those present in the said —NH₂ grouping, consisting solely of elements of the class consisting of carbon, hydrogen and oxygen, and the ingredients of (a) and (b) being employed in molar proportions ranging from 1:10 to 10:1, and (2) a solvent for the reaction product of (1).

6. A heat-curable composition comprising the heat-convertible resinous product of reaction of ingredients comprising (1) a polyethylene melamine which is a polyamino-s-triazine wherein at least two of the amino nitrogen atoms each has one ethylene group attached thereto instead of the two hydrogen atoms and (2) a different nitrogenous compound containing a radical represented by the formula

where R represents a member of the class consisting of hydrogen and hydroxyhydrocarbon radicals and R' represents a member of the class consisting of hydrogen, hydrocarbon radicals and hydroxyhydrocarbon radicals, any other elements of the said nitrogenous compound of (2), in addition to those present in the aforementioned radical represented by the formula

consisting solely of elements of the class consisting of carbon, hydrogen and oxygen, and the ingredients of (1) and (2) being employed in molar proportions ranging from 1:10 to 10:1.

7. A product comprising the cured composition of claim 6.

8. A composition comprising the resinous product of reaction of ingredients comprising (1) triethylene melamine, the formula for which is

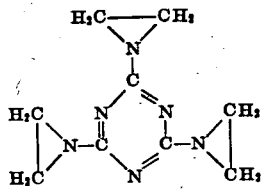

and (2) an alkanolamine, the ingredients of (1) and (2) being employed in molar proportions ranging from 1:10 to 10:1.

9. A resinous product of reaction of ingredients comprising (1) triethylene melamine, the formula for which is

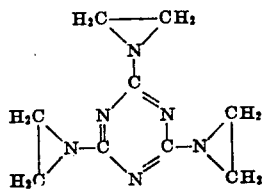

and (2) an ethanolamine, the ingredients of (1) and (2) being employed in molar proportions ranging from 1:10 to 10:1.

10. A resinous composition which is the product of reaction of ingredients comprising (1) triethylene melamine, the formula for which is

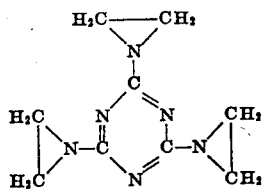

and (2) monoethanolamine, the ingredients of (1) and (2) being employed in molar proportions ranging from 1:3 to 3:1.

11. A composition comprising the product of reaction of ingredients comprising (1) triethylene melamine having the formula given in claim 3, (2) an alkanolamine and (3) an alcohol represented by the formula R—OH where R represents a monovalent hydrocarbon radical, the ingredients of (1) and (2) being employed in molar proportions ranging from 1:10 to 10:1 and the alcohol of (3) being employed in an amount ranging from 0.1 to 50 times that of the total weight of the ingredients of (1) and (2).

12. A coating composition containing (1) a soluble product of reaction of ingredients comprising (a) triethylene melamine having the formula given in claim 3, (b) monoethanolamine and (c) an alcohol represented by the formula R—OH where R represents a lower alkyl radical, the ingredients of (a) and (b) being employed in molar proportions ranging from 1:10 to 10:1 and the alcohol of (c) being employed in an amount ranging from 0.1 to 50 times that of the total weight of the ingredients of (a) and (b), and (2) a solvent for the reaction product of (1).

13. A composition comprising the resinous product of reaction of ingredients comprising (1) triethylene melamine, the formula for which is

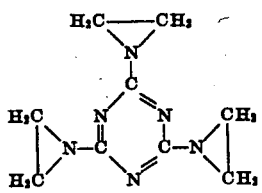

and (2) a polyalkylenepolyamine, the triethylene melamine of (1) and the polyalkylenepolyamine of (2) being employed in molar proportions ranging from 1:10 to 10:1.

14. A composition comprising the resinous product of reaction of ingredients comprising (1) triethylene melamine having the formula given in claim 3, (2) a polyalkylene polyamine and (3) an alcohol represented by the formula R—OH where R represents a monovalent hydrocarbon radical, the ingredients of (1) and (2) being employed in molar proportions ranging from 1:10 to 10:1 and the alcohol of (3) being employed in an amount ranging from 0.1 to 50 times that of the total weight of the ingredients of (1) and (2).

15. A composition comprising the resinous product of reaction of ingredients comprising (1) triethylene melamine, the formula for which is

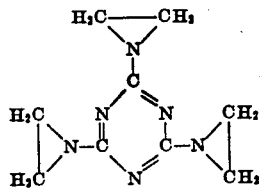

and (2) a hydrocarbon-substituted amine containing at least one hydrogen atom attached to the amino nitrogen atom, the ingredients of (1) and (2) being employed in molar proportions ranging from 1:10 to 10:1.

16. A resinous composition comprising the product of reaction of ingredients comprising (1) triethylene melamine, the formula for which is

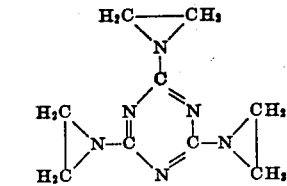

and (2) a primary, hydrocarbon-substituted amine, the ingredients of (1) and (2) being employed in molar proportions ranging from 1:3 to 3:1.

17. A composition comprising the resinous product of reaction of ingredients comprising (1) triethylene melamine having the formula given in claim 3, (2) a hydrocarbon-substituted amine containing at least one hydrogen atom attached to the amino nitrogen atom and (3) an alcohol represented by the formula R—OH where R represents a monovalent hydrocarbon radical, the ingredients of (1) and (2) being employed in molar proportions ranging from 1:10 to 10:1 and the alcohol of (3) being employed in an amount ranging from 0.1 to 50 times that of the total weight of the ingredients of (1) and (2).

18. The method of preparing a new synthetic material which comprises effecting reaction, at a temperature ranging between room temperature and a temperature below the temperature of decomposition of the reaction product, between ingredients comprising (1) a polyethylene melamine which is a polyamino-s-triazine wherein at least two of the amino nitrogen atoms each has one ethylene group attached thereto instead of the two hydrogen atoms and (2) a different nitrogenous compound containing a radical represented by the formula

where R represents a member of the class consisting of hydrogen and hydroxyhydrocarbon radicals and R' represents a member of the class consisting of hydrogen, hydrocarbon radicals and hydroxyhydrocarbon radicals, any other elements of the said nitrogenous compound of (2), in addition to those present in the aforementioned radical represented by the formula

consisting solely of elements of the class consisting of carbon, hydrogen and oxygen, and the ingredients of (1) and (2) being employed in molar proportions ranging from 1:10 to 10:1.

19. A method as in claim 18 wherein the reaction is effected by heating a liquid medium containing the ingredients of (1) and (2) and in which the said ingredients are inert, said reaction being effected at a temperature not exceeding the boiling temperature of the reaction mass.

20. A method as in claim 18 wherein the reaction is effected in the presence of an alcohol represented by the formula R—OH where R represents a monovalent hydrocarbon radical, the said alcohol being employed in an amount ranging from 0.1 to 50 times that of the total weight of the polyethylene melamine of (1) and the nitrogenous compound of (2).

EDWARD L. KROPA.
HENRY P. WOHNSIEDLER.

REFERENCES CITED

The following references are of record in the file of this patent:

UNITED STATES PATENTS

| Number | Name | Date |
|---|---|---|
| 2,524,727 | Dudley | Oct. 3, 1950 |

OTHER REFERENCES

Smith, Synthetic Fiber Developments in Germany (Textile Research Institute) 1946, pp. 28, 29, 876 and 877.